March 13, 1934.  H. J. NATHAN  1,950,860
HYDRAULIC GEAR SHIFTING MECHANISM
Filed Feb. 7, 1933   6 Sheets-Sheet 2
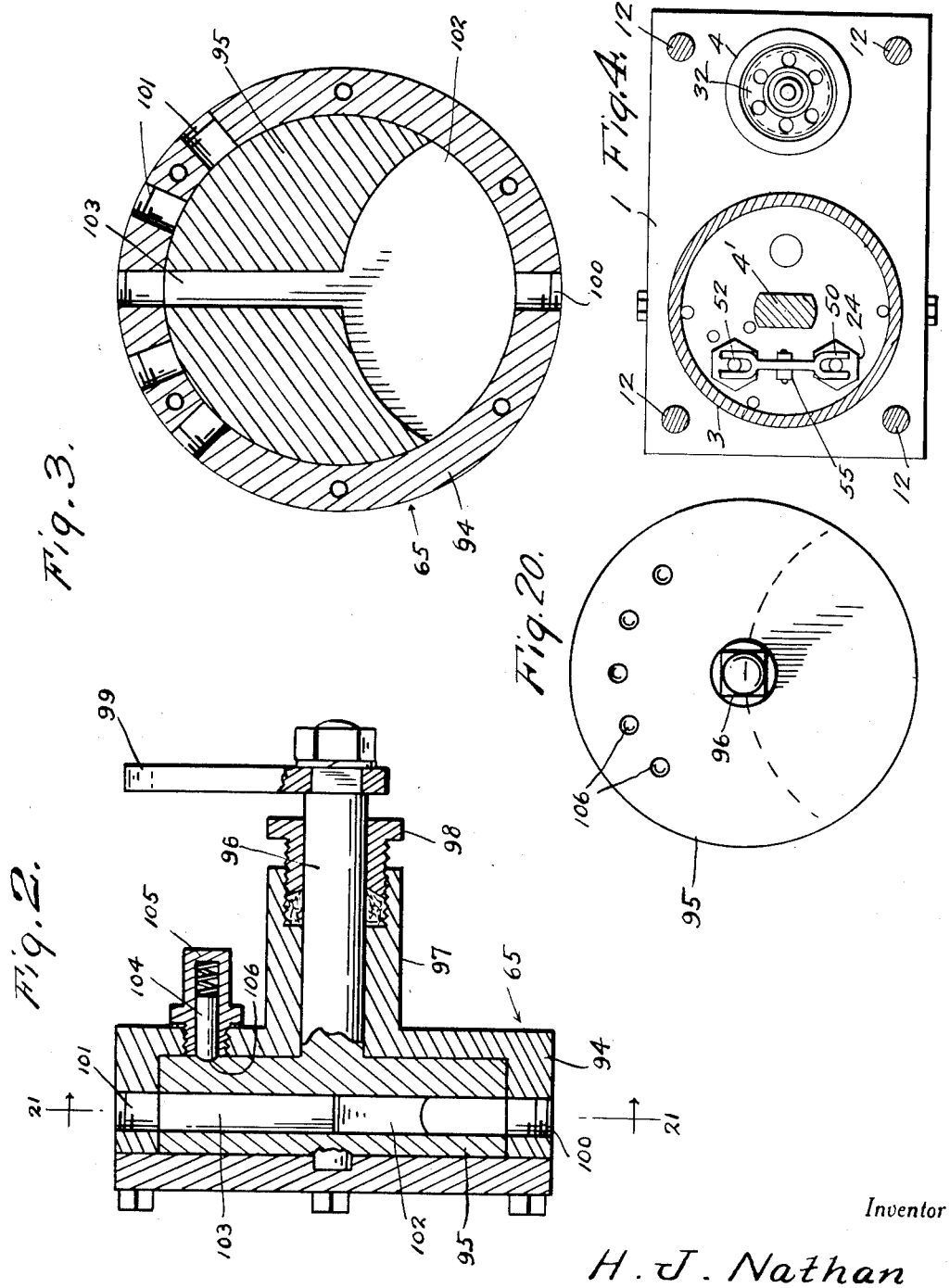
Inventor
H. J. Nathan
By Clarence A. O'Brien
Attorney March 13, 1934.   H. J. NATHAN   1,950,860
HYDRAULIC GEAR SHIFTING MECHANISM
Filed Feb. 7, 1933   6 Sheets-Sheet 3
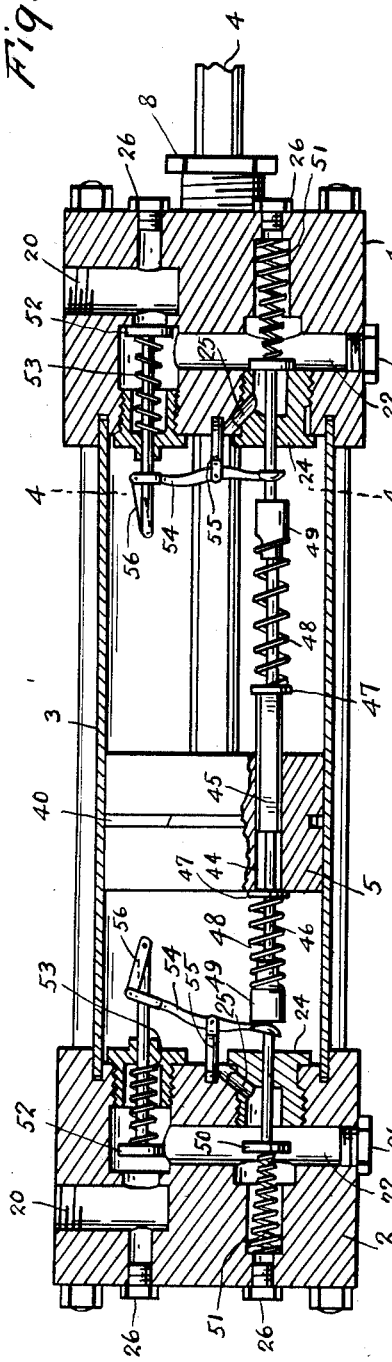
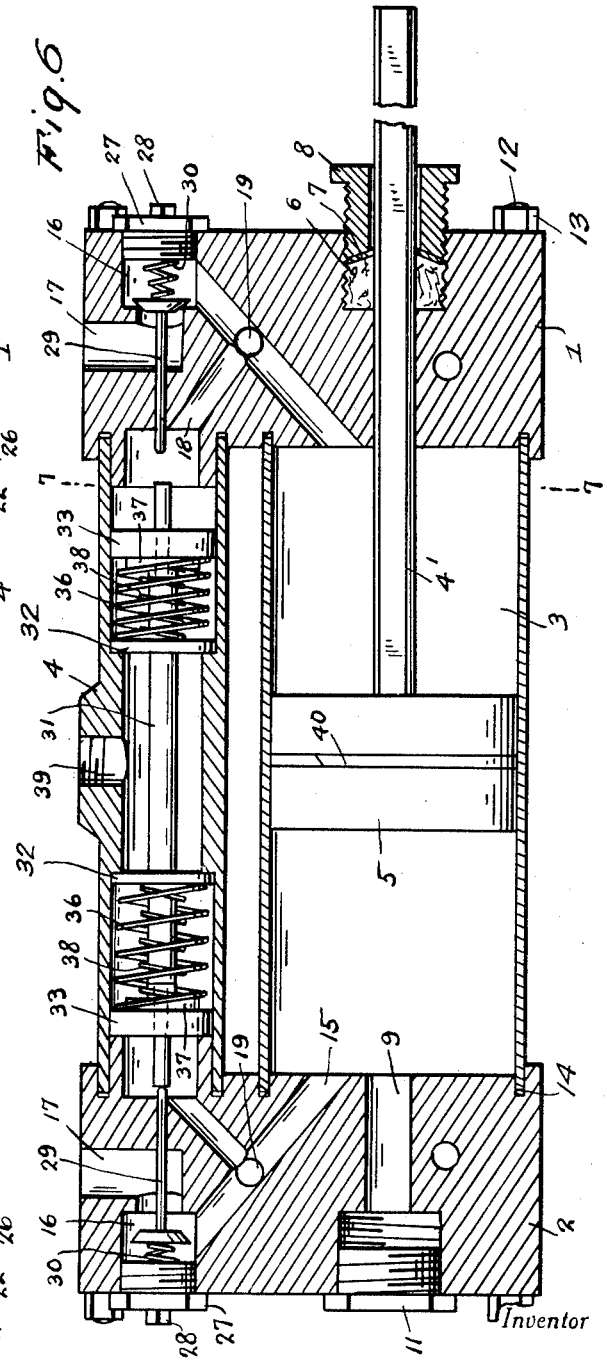
Inventor
H. J. Nathan
By Clarence A. O'Brien
Attorney March 13, 1934. H. J. NATHAN 1,950,860
HYDRAULIC GEAR SHIFTING MECHANISM
Filed Feb. 7, 1933 6 Sheets-Sheet 4
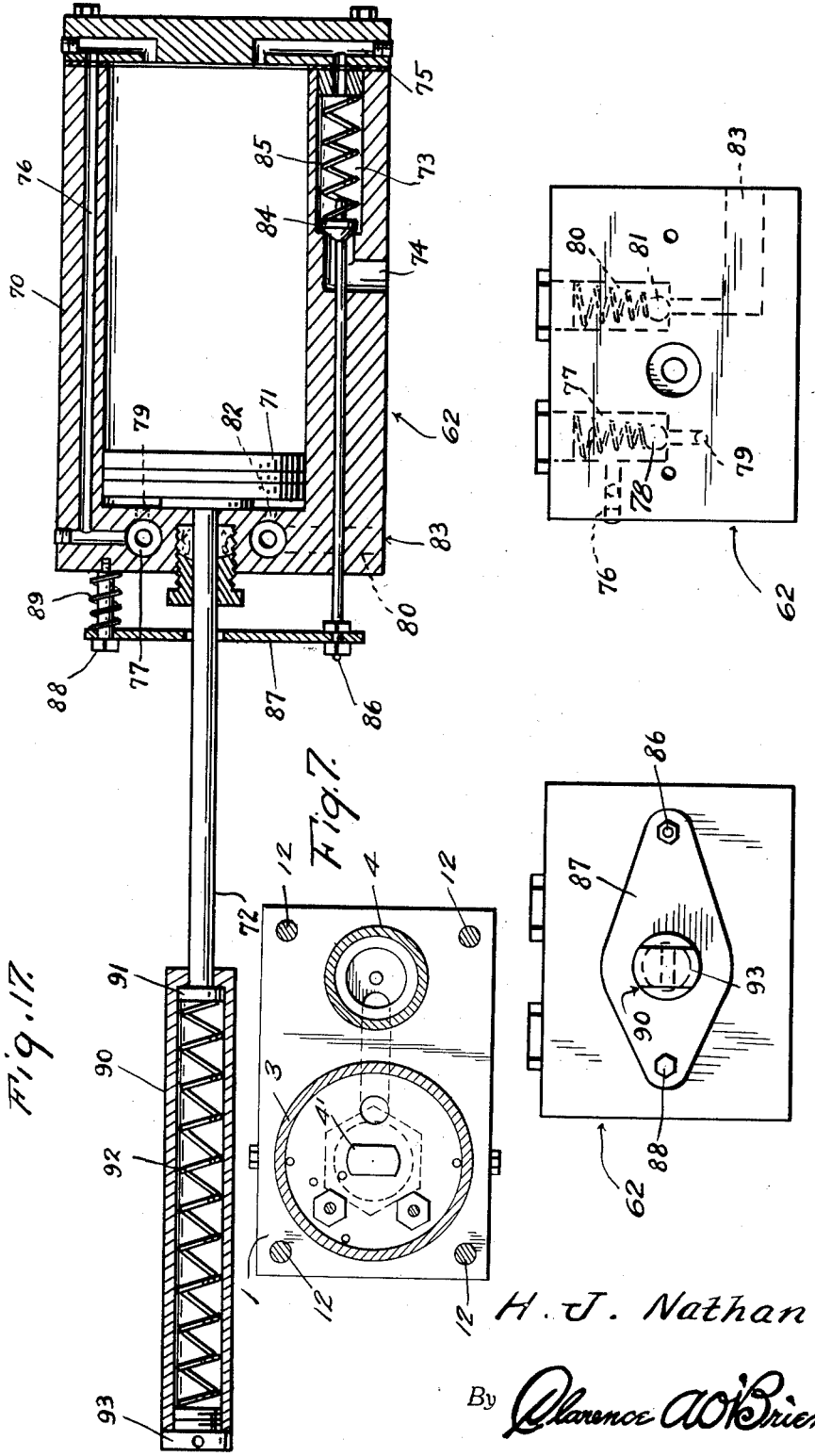
Inventor
H. J. Nathan
By Clarence A. O'Brien
Attorney

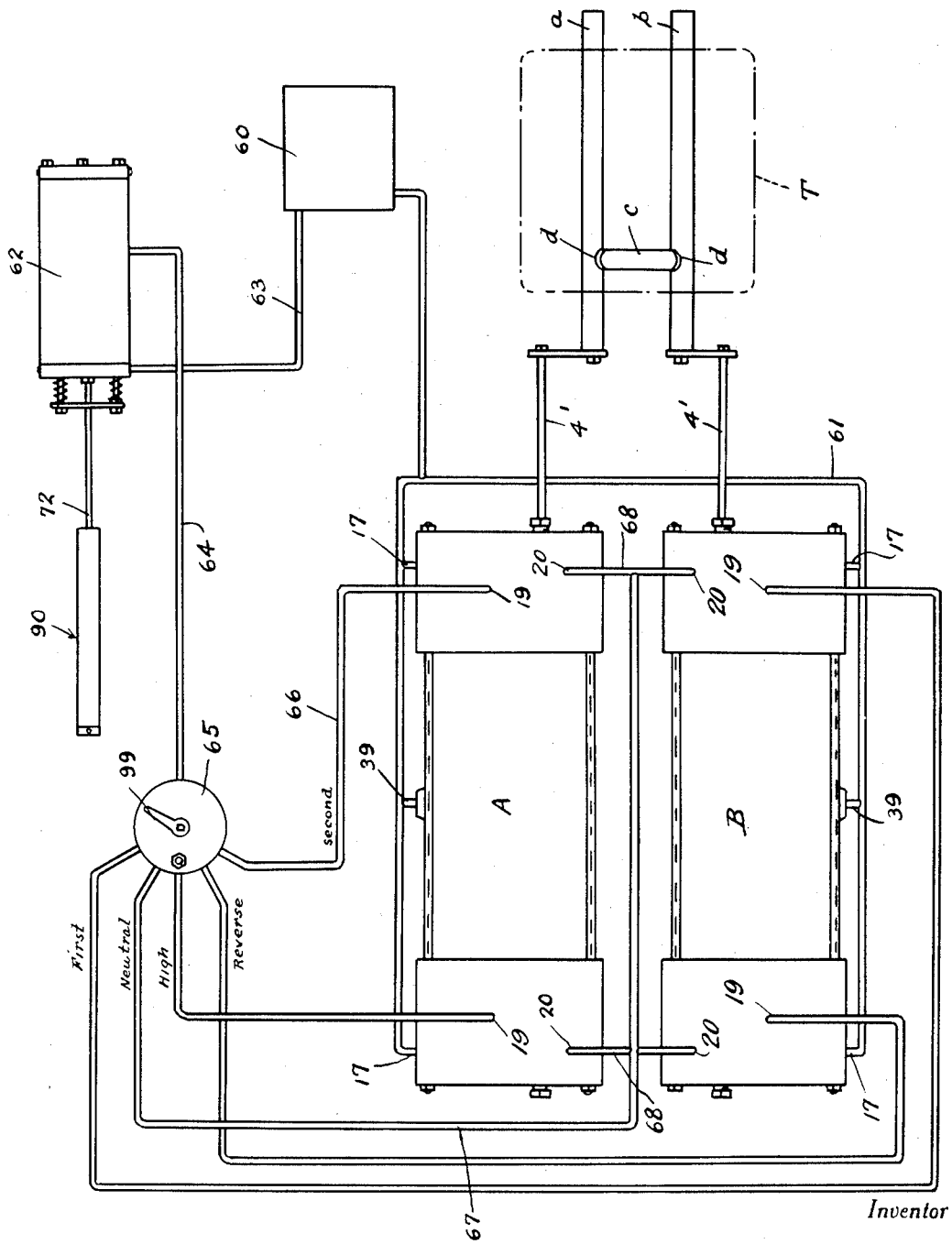

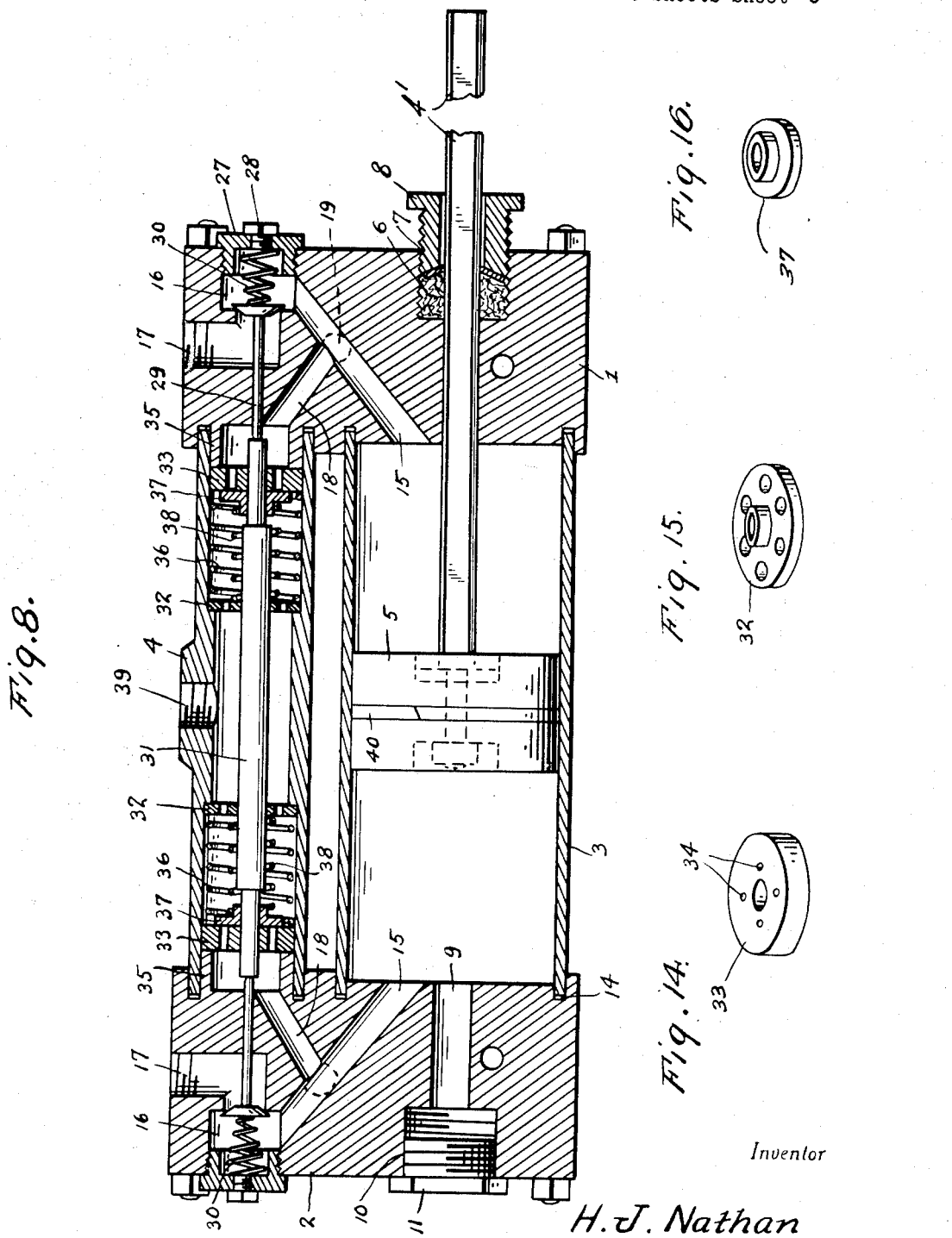

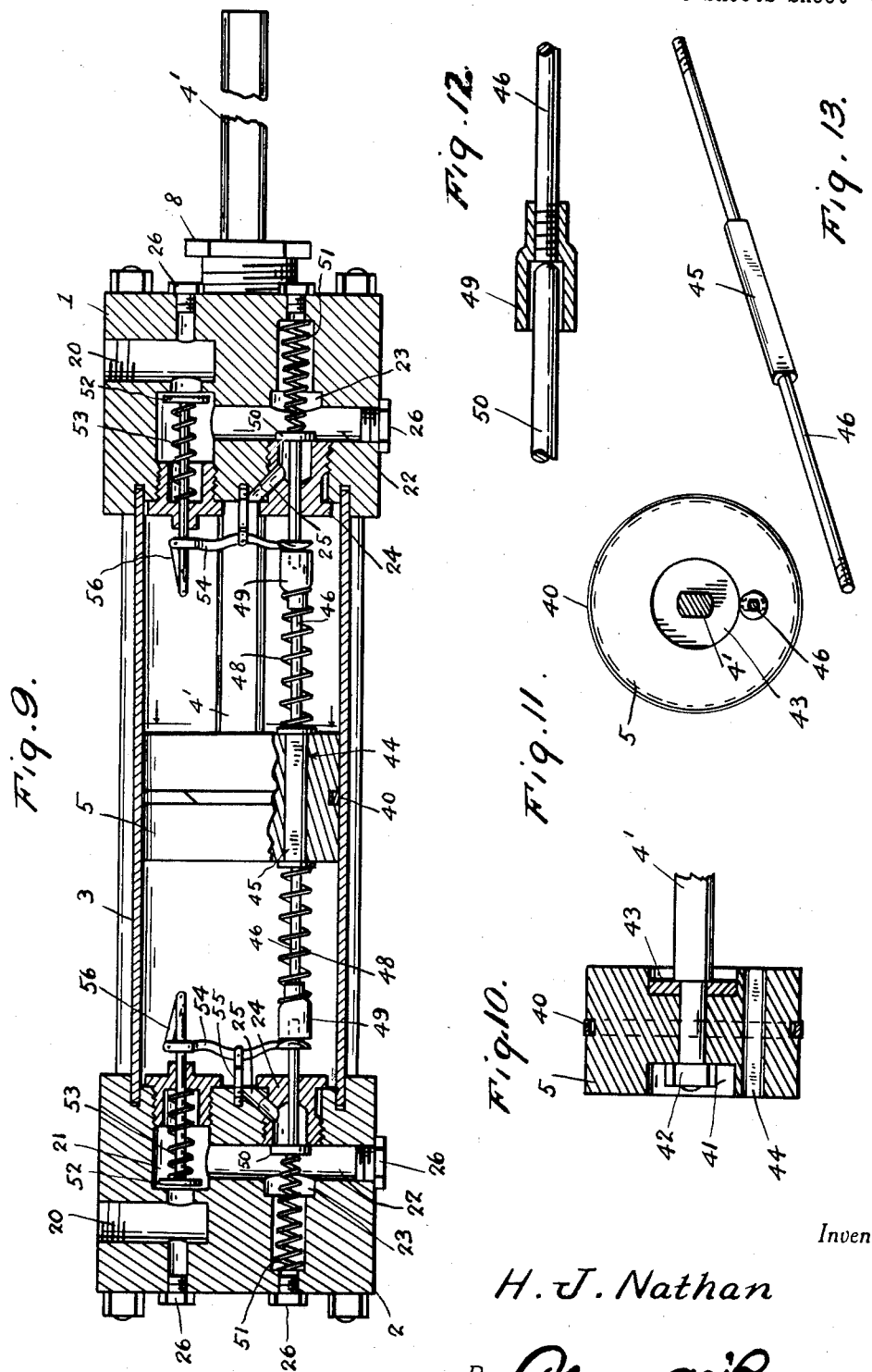

Patented Mar. 13, 1934

1,950,860

UNITED STATES PATENT OFFICE 1,950,860

HYDRAULIC GEAR SHIFTING MECHANISM

Herbert J. Nathan, Bismarck, N. Dak.

Application February 7, 1933, Serial No. 655,632

7 Claims. (Cl. 121—38)

This invention relates to a hydraulic gear shifting mechanism, the general object of the invention being to provide means for shifting gears by hydraulic means without the operator of a motor vehicle or the like taking his hands off the steering wheel and whether or not the engine is running and without clashing of the gears.

Another object of the invention is to provide means for operating the mechanism from a pressure supply through means of a simple valve member which controls the flow of fluid from the supply to the mechanism.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts through the several views, and in which:

Figure 1 is a diagrammatic view of the system.

Figure 2 is a sectional view through the main control valve.

Figure 3 is a section on line 21—21 of Figure 2.

Figure 4 is a section on the line 4—4 of Figure 5.

Figure 5 is a longitudinal sectional view showing the control valves and their associated parts when the piston is shifted.

Figure 6 is a longitudinal sectional view showing the release valves and their associated parts when pressure is applied.

Figure 7 is a section on the line 7—7 of Figure 6.

Figure 8 is a longitudinal sectional view, similar to Figure 6 showing the parts in a neutral position.

Figure 9 is a longitudinal sectional view similar to Figure 5 but showing the parts in a neutral position.

Figure 10 is a sectional view through the piston.

Figure 11 is an end view of the piston with the piston rod and the control valve rod in section.

Figure 12 is a detail view partly in section showing how the cup-shaped member on an end of the control valve rod engages a valve stem.

Figure 13 is a perspective view of the control valve rod.

Figure 14 is a view of one of the perforated plunger members.

Figure 15 is a view of one of the spring seat plungers in the release cylinder.

Figure 16 is a view of one of the valve members for the plunger member shown in Figure 14.

Figure 17 is a longitudinal sectional view of the means for compressing the fluid.

Figure 18 is an end view of the cylinder shown in Figure 17.

Figure 19 is a similar view but with the valve operating plate removed and showing the valve in dotted lines.

Figure 20 is a view of the rotor of the main control valve.

In these drawings the invention is shown in use for shifting the gears of a motor vehicle which is provided with three forward speeds and a reverse speed, and in Figure 1 the transmission housing is shown at T in dotted lines and the shifting shafts are shown at $a$ and $b$. This figure also shows a lock $c$ having rounded ends to engage in recesses $d$ in the shafts $a$ and $b$, these parts being so formed that when one of the shafts is moved from a neutral position the lock is forced into the recess of the other shaft so as to prevent movement of this other shaft until the first shaft has been moved to neutral position.

The invention includes a pair of cylinders A and B, each of which comprises the heads 1 and 2, the main cylinder 3 and the small cylinder 4. A piston 5 is located in the cylinder 3 and has its rod 4' of non-circular shape in cross section which passes through a similar shaped hole in the head 1 so as to prevent rotary movement of the piston.

The rod passes through the packing 6 which is held in place by a washer 7 and the packing nut 8, the washer acting to prevent this packing material from passing through the bore of the nut 8, which bore is made slightly larger than the cross sectional area of the rod 4. The head 2 is formed with a hole 9 and a countersunk threaded part 10 so that the rod 4' and the packing means may be placed in this head 2 if desired.

That end of the device which the rod does not pass through has the plug 11 threaded in the part 10 as shown.

The cylinders 3 and 4 fit in grooves formed in the inner faces of the heads 1 and 2 and the parts are held assembled by the rods 12 which pass through holes in the heads and have their ends threaded to receive the nuts 13. Gaskets 14 are placed in the grooves to provide tight joints between the cylinders and heads.

One piston rod 4' is connected to a shaft $a$ and the other rod is connected to the shaft $b$ as shown in Figure 1.

Each head is formed with a diagonal passage 15 which leads from an end of the cylinder 3 to a chamber 16 in the head and an exhaust passage 17 is formed in each head and has its inner end in communication with the chamber 16. A branch passage 18 connects the passage 15 with an end of the small cylinder 4. This head is also provided with an inlet passage 19 which is in communication with the passage 15.

Each head is also formed with a passage 20 opening out through a side of the head and in communication with a chamber 21 in the head which in turn is connected by a passage 22 with a chamber 23 opening out into the cylinder 3 and having its inner end closed by a plug 24 with a port 25 communicating the chamber 23 with the cylinder 3.

The series of interior passages which are from necessity bored through the exterior walls of the chamber 16 are closed by the plugs 26 and by removing some of these plugs the operation of the valves and other parts can be seen and each chamber 16 is closed by a plug 27 which has an opening therein closed by a small plug 28 so that by removing the plug 28 the operation of the valve within said chamber 16 can be observed.

A release valve 29 controls communication between the chamber 16 and discharge passage 17 and this valve is normally held on its seat by the spring 30 which bears against the head of the valve and against the plug 27.

A slide rod 31 is supported in the clyinder 4 by the perforated discs 32, one of which is shown in Figure 15, and these discs are seated on shoulders formed in the cylinder 4. A pair of plunger discs 33 are located in the cylinder 4 adjacent the ends thereof and are normally held against shoulders formed by tubular parts 35, formed on the heads and extending into the cylinder 4, by a spring 36 which has one end bearing against a disc 33 and its other end against a disc 32.

The disc 33 is formed with a number of small perforations 34 and these perforations are normally held closed by a valve disc 37, shown in Figure 16, which is held against the plunger disc by a spring 38 which has one end bearing against the disc 37 and its other end against the disc 32. The perforations 34 will permit some of the fluid to pass through but not enough to prevent movement of the plunger disc by the fluid. The perforations in the disc 32 are large enough to permit any fluid passing by the plunger disc 33 to freely escape into the central part of the cylinder 4 and this fluid will pass through the discharge port 39. The valve disc 37 will stop the fluid passing through the holes 34 in the disc 33 when the spring 38 has been compressed by inward movement of the discs 33 and 37, as shown at the right in Figure 6. Thus no fluid can pass through the small cylinder 4 to the exhaust and all the fluid entering a passage 19 must pass into the cylinder 3 and act against the piston 5, which insures faster action of said piston 5.

The piston 5 is provided with one or more rings 40 and has recesses 41 in its ends one of which receives the nut 42 which holds the piston to the rod and the other of which receives a washer 43 engaging a shoulder on the rod 4' for preventing said shoulder from biting into the piston. The piston is also formed with a non-circular passage 44 located to one side of the center thereof for receiving the non-circular part 45 of the control valve plunger rod 46. The part 45 is made of larger cross sectional area than the rest of the rod so that its ends form shoulders for engaging the washers 47 on the rod 46 and these washers forms seats for the springs 48 and the ends of the rod 46 are threaded into the cup members 49 which receive the inner ends of the stems of the control valves 50.

These valves control communication between the passages 22 in the heads and interior of the cylinder 3 through the ports 25 and they are normally pressed upon the seats by the springs 51. An intermediate control valve 52 controls communication between each chamber 21 and the passage 20 and is normally held on its seat by a spring 53. A rocker arm 54 is supported from the inner face of each head by a support 55 and one end of each arm is connected with the inner end of the stem of the valve 52 by a link 56 and the other end of the arm is forked and straddles the stem on the valve 50 and is pressed upon by a cup member 49 when the rod 46 is moved towards said arm so that the arm is rocked when the valve 50 moves off its seat. Thus the two valves 50 and 52 are moved off of their seats when the plunger rod 46 is moved toward the head.

As shown in Figure 1, a supply tank 60 forms part of the system and pipes 61 connect the four discharge passages 17 of the two cylinders A and B and the exhaust ports 39 of the two cylinders to said tank so that the fluid discharge from the two cylinders will flow back to this tank 60. A pump cylinder 62, which will be described in detail hereinafter, has its inlet connected with the tank 60 by a pipe 63 and the discharge of the pump is connected by pipe 64 with the main or master control valve 65, which will also be described in detail hereinafter.

The pipes 66 connect the outlets of this valve 65 with the inlet passages 19 of the four heads of the two cylinders A and B and a pipe 67 connects one of the outlets of the valve 65 with the branch pipes 68 which are connected with the passages 20 of the four heads.

For facilitating the description of the operation of the device the pipes 66 are indicated with the words "Second", "Reverse", "High" and "First" and the pipe 67 with the word "Neutral" as in Figure 1. It will of course be understood that the entire system is filled with oil or the like and when the parts are in neutral position they will occupy the position shown in Figures 8 and 9.

When fluid enters the inlet passage 19 in the head 1, it cannnot pass into cylinder 3 as the cylinder is full of oil and both release valves 29 are closed so that the oil cannot escape. However, this oil will pass through the branch passage 18 into the cylinder 4 and press the adjacent plunger 33 and its valve disc 37 inwardly until the valve disc 37 strikes shoulder of the rod 31 and further movement of the parts under the action of the pressure of the fluid will move said rod 31 so that the rod will force the valve 29 of head 2 off the seat, as shown in Figure 6, so that the fluid in front of the piston 5 can escape through the passages 15 and 17 of the head 2, through the discharge pipes 61 back into the tank 60. Then the fluid entering the head 1 will exert pressure against the piston 5 and move the piston towards the head 2 so that the shift rods $a$ or $b$ to which the piston is attached, will be actuated to shift the gears.

As the piston 5 moves it will engage a washer or collar 47 on the rod 46 and thus a spring 48 will be compressed and the rod 46 moved so that the valve 50 and the valve 52 of head 2 will be moved to open position, the latter valve 52 being opened farther by movement of the rocker arm 54, as this valve 54 is normally held partly opened as shown in Figure 9. The valves 50 and 52 of the head 1 will be closed by their springs, thus checking fluid passage through passage 22 in either direction, as shown in Figure 5. However, no fluid will pass by the open valves 50 and 52 even though the cylinder 3 is in communication with the passages controlled by said valves by port 25, as the main valve 65 is holding the neutral line 67 closed and valves 50 check fluid passage through branch pipe line 68 and 67 and chamber 22 into port 25 on cylinder which is not being shifted, as shown in Figure 9. Lock $c$ will be forced into notch on shaft $a$ or $b$, which ever one remains in neutral position while one is being shifted, thus locking it so it can not be shifted until the one first shifted is shifted back into neutral, in order to release lock $c$.

After the parts of cylinder A, for instance, have been shifted to the position shown in Figure 5 and it is desired to shift the piston 5 of cylinder B to the left in Figure 6, for instance, the valve 65 is turned to place the inlet passage 19 of head 1 of cylinder B in communication with the pump 62. The fluid from the pump will thus enter the passage 15 of head 1 of cylinder B, but as the piston 5 and its rod are locked against movement by the lock $c$, said piston cannot move so the fluid will pass from the cylinder 3 through the port 25 of head 1 of cylinder B, forcing valve 50 off its seat, so that the fluid will enter passage 22 and flow past the partly open valve 52 into the passage 20 and through portions of the branches 68 and portion of pipe 67 into the head 2 of cylinder A and as the parts of this cylinder are in the position shown in Figure 5, with the valves 52 and 50 in open position, the fluid will enter the passage 20 of head 2 of cylinder A, into the passage 22 and then through the port 25 into the space of cylinder A formed by the piston 5 and the head 2. From this space of cylinder A, the fluid will pass through passages 15 and 18 of head 2 into the small cylinder 4 and thus cause the plunger disc 33 to move the rod 31 to a position where said rod will open the valve 29, head 1 of cylinder A, so that the fluid in cylinder A which is holding the piston 5 in the position it occupies in Figure 5, escapes through the discharge passage 17 and thus the pressure of fluid in the restricted part of the cylinder A will act on the piston 5 and move it to neutral position. As soon as the piston in cylinder A reaches neutral position, the valve 50 closes and thus no more fluid can enter the cylinder A and the pressure of this fluid in cylinder B acts on the piston 5 of said cylinder B to move it to the left in Figure 6, as the release valve 29 in head 2 of cylinder B has been opened by the pressure of fluid entering the head 1 of said cylinder B. Thus the shift rod $b$, which is connected to the piston of cylinder B, is shifted and the lock $c$ will lock the rod $a$ in a neutral position for, of course, this rod $a$ has been moved to neutral position by the movement of the piston in cylinder A to neutral position.

When it is desired to move or shift a cylinder in the opposite direction when said cylinder is in position of cylinder Figure 5, valve 65 is turned to communicate with passage 19 through pipe line 66 of said cylinder, which can be referred to as end 2, Figure 5, thus fluid enters passages 18 opening release valve 29 of end 1 by operating disc in cylinder 4, as before described, thus releasing fluid at end 1 which will allow piston with rod attached to move towards end 1.

It is understood that in the latter described operation the fluid would not escape through passage 20, although valves 50 and 52 are in open position, because passage 20 leads to crosspipes 68 and 67, the latter being checked at valve 65 and crosspipe checked by valves 50.

When it is desired to shift back into neutral position a piston 5, valve 65 is moved to communicate with passage 20 through crosspipes 68 and 67, whichever cylinder is shifted will have valves 50 and 52 in the position shown in Figure 5. Fluid would enter cylinder, in above mentioned position, through opening 20, thus moving it into neutral position, as before described, which occurs when valve 50 closes, which checks further operation of cylinder.

It is understood that all operating parts of cylinder 4 move back into position shown in Figure 8 as soon as the fluid pressure is released on above mentioned cylinders.

Figures 17, 18 and 19 show the pump casing which includes the cylinder 70 and a piston 71, the rod of which is shown at 72. A wall of the cylinder has a chamber 73 therein which has a port 74 to which the pipe 64 is connected and the other end of the chamber 73 is in communication with the cylinder 70 by the passages shown generally at 75. A passage, shown generally at 76 connects the rear end of the cylinder with the opposite front end through which the rod 72 passes with a chamber 77 containing a spring-pressed check valve 78 and said chamber is in communication with the piston end of the cylinder by the port 79.

A second chamber 80 is arranged in the piston end of the cylinder and contains a spring-pressed check valve 81 and this chamber is in communication with the piston end of the cylinder by a port 82 and said chamber extends through the interior of the cylinder as shown at 83 where it is connected with the pipe 63 leading to the tank 60.

Thus it will be seen that as the piston 71 moves inwardly it will create a suction to the rear of it so that oil will be drawn from the tank 60 through the pipe 63 into the chamber 80 and then through the port 82 into the cylinder in rear of the piston. The oil in front of the piston will be forced through the passage 75 into the chamber 73 and through the port 74 into the pipe 54 and thus into the valve 65, provided the valve 84 is open.

On the return stroke of the piston the check valve 81 closes so as to prevent the oil in rear of the piston from flowing back into the tank 60 so that this oil will be forced through the port 79 passing the valve 78 into the chamber 77 and then through the passage 76 into the cylinder so that the cylinder will be refilled ready for the discharge stroke of the piston.

The valve 84 is normally held on its seat by a spring 85 in the chamber 73 and the stem 86 of the valve is attached to a plate 87 having an end mounted on a bolt 88 carried by the cylinder and said plate is pressed against the head of the bolt by a spring 89 on said bolt. An elongated casing 90 receives a head 91 on the free end of the rod 72 and a spring 92 in the casing 90 has one end bearing against the head 91 and its other end against a plug 93 which closes the opposite end of the casing 90.

This casing 92 is adapted to be fastened to a part of the clutch mechanism so that when the clutch is released it forces the casing 90 towards the plate 87. The parts are so adjusted that the casing 90 will strike the plate 87 and cause the same to open the valve 84 when the clutch is fully released. Thus when the clutch pedal is operated the casing 90 is moved towards the cylinder and compresses spring 92 and as the valve 84 is closed the piston is not moved but as soon as the casing strikes the plate 87 the valve 84 is opened so that the spring will operate the piston and cause the same to force the fluid from the cylinder to the valve 65.

When the clutch is engaged the parts move back to the position shown in Figure 17 which recharges the cylinder from the tank as before described.

Figures 2, 3 and 20 show the construction of the valve 65 and as shown in these figures the valve comprises a casing 94 containing a rotor 95 the shaft 96 of which passes through the tubular part 97 of the casing and through the packing gland 98 and has an operating lever 99 on its outer end. The casing is provided with an inlet port 100 to receive the pipe 64 and the outlet ports 101 to receive the pipes 66 and 67.

The rotor 95 is provided with a substantially semi-circular recess 96 which always remains in communication with the inlet port 100 and with a passage 103 which is of the same width as a port 101. Thus the port 100 can be connected with any one of the ports 101 by moving the rotor.

A spring actuated detent 104 is placed in a housing 105 formed on the casing 94 and is adapted to enter any one of the number of recesses 106 in the rotor for indicating and holding the rotor in a position to which it has been adjusted for communicating the passage 103 with any one of the desired ports 101.

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. In a device of the class described, a cylinder having passages in its ends, a piston in said cylinder, a rod connected with the piston and passing through one end of the cylinder, a release valve in each end of the cylinder for controlling some of the passages, manually controlled means for introducing fluid into the ends of the cylinder, and means whereby fluid introduced into one end will open the release valve at the opposite end, such means including a small cylinder in which the stems of the valves extend, a plunger rod in said small cylinder, engaging the ends of the stems and having its ends reduced to form shoulders, a plunger disc slidably arranged on each reduced part, springs for normally holding the discs in spaced relation to the shoulders, but permitting each disk to move into engagement with a shoulder under pressure of fluid, to impart movement to the rod.

2. In a device of the class described, a cylinder having passages in its ends, a piston in said cylinder, a rod connected with the piston and passing through one end of the cylinder, a release valve in each end of the cylinder for controlling some of the passages, manually controlled means for introducing fluid into the ends of the cylinder, and means whereby fluid introduced into one end will open the release valve at the opposite end, such means including a small cylinder in which the stems of the valves extend, a plunger rod in said small cylinder, having its ends engaging the stems, springs for holding the valves in closed position with their stems contacting the ends of the rod, said rod having reduced end portions forming shoulders, a plunger disc slidably arranged on each reduced part, springs for normally holding the discs in spaced relation to the shoulders, said discs having perforations therein, a valve for closing the perforations in each disc, said valves engaging the shoulders when the discs are moved inwardly by the fluid pressure.

3. In a device of the class described, a pair of cylinders, a piston in each cylinder, a rod connected with each piston and passing through an end of the cylinder, each cylinder having passages in each end thereof, release valves in the ends of each cylinder for controlling the discharge passages, means whereby fluid introduced into one end of the cylinder will open the valve at the opposite end thereof, manually controlled means for introducing fluid into either end of each cylinder, some of the passages in each end of each cylinder being in communication with the interior of the cylinder, control valves for controlling said communication, means for connecting said last-mentioned passages at the ends of each cylinder with the passages at the other end and in the other cylinder, and means whereby movement of said piston towards one end of each cylinder will open control valves at said end and permit the control valve at the other end to close.

4. In a device of the class described, a pair of cylinders, a piston in each cylinder, a rod connected with each piston and passing through an end of the cylinder, each cylinder having passages in each end thereof, release valves in the ends of each cylinder for controlling the discharge passages, means whereby fluid introduced into one end of the cylinder will open the valve at the opposite end thereof, manually controlled means for introducing fluid into either end of each cylinder, some of the passages in each end of each cylinder being in communication with the interior of the cylinder, control valves for controlling said communication, means for connecting said last-mentioned passages at the ends of each cylinder with the passages at the other end and in the other cylinder, and means whereby movement of said piston towards one end of each cylinder will open control valves at said end and permit the control valves at the other end to close, a pair of gear shifting shafts each of which is connected to a piston rod and means for locking one shaft in neutral position when the other shaft has been moved out of neutral position.

5. In a device of the class described, a pair of cylinders, a piston in each cylinder, a rod connected with each piston and passing through an end of the cylinder, each cylinder having passages in each end thereof, release valves in the ends of each cylinder for controlling the discharge passages, means whereby fluid introduced into one end of the cylinder will open the valve at the opposite end thereof, manually controlled means for introducing fluid into either end of each cylinder, some of the passages in each end of each cylinder being in communication with the interior of the cylinder, control valves for controlling said communication, means for connecting said last-mentioned passages at the ends of each cylinder with the passages at the other end and in the other cylinder, and means whereby movement of the said piston towards one end of each cylinder will open control valves at said end and permit the control valve at the other end to close, a pair of gear shifting shafts each of which is connected to a piston rod and means for locking one shaft in neutral position when the other shaft has been moved out of neutral position, a supply tank, pipes connecting the same with the discharge passages, a pump device connected with the tank and with the manually controlled means for forcing fluid from the tank to such means.

6. In a device of the class described, a pair of cylinders, a piston in each cylinder, a gear shifting member connected with each piston, means for locking one member in neutral position when the other member has been moved out of neutral position, a source of compressed fluid, a valve connected with the discharge thereof and containing a plurality of discharge ports, means for opening any one of said discharge ports to place the same in communication with the inlet port, each cylinder having passages in each end thereof, some of which are inlet passages, pipes connecting said inlet passages with the discharge ports of the valve, one of the passages being a discharge port, a valve controlling said discharge port, means whereby fluid introduced into one end of each cylinder will open the discharge port at the opposite end thereof, means for connecting other passages in the ends of the cylinders together, control valves controlling said other passages, springs for normally holding the valves closed and means actuated by the pistons for opening the control valves toward which the piston is moved while permitting the valves at the other end of each cylinder to close, and a pipe connecting one of the discharge ports of the main valve with said other passages.

7. In a device of the class described, a cylinder having a head at each end thereof, a small cylinder having its ends engaging the heads, a piston in the first mentioned cylinder having a rod passing through one of the heads, each head having a passage therein extending from an end of the first mentioned cylinder through a part of the head, with a valve seat at an intermediate portion of the passage and each head having a passage communicating with an end of the small cylinder and communicating with the first mentioned passage between the seat and an end of the first mentioned cylinder, each head also having an inlet passage in communication with that part of the first mentioned passage which is in communication with the second mentioned passage, a valve engaging each seat and having a stem passing through the head into the small cylinder, a rod slidably supported in the small cylinder and having its ends engaging the inner ends of the stems, springs for holding the valves upon their seats, plunger discs slidably arranged on said rod, said rod having shoulders thereon engaged by the discs when the same are moved inwardly by the pressure of fluid for imparting movement to the rod and spring means for normally holding the discs in their outward positions and spaced from the shoulders.

HERBERT J. NATHAN.